(12) United States Patent
Leprat et al.

(10) Patent No.: US 11,623,827 B2
(45) Date of Patent: Apr. 11, 2023

(54) METHOD AND DEVICE FOR CONVEYING CONTAINERS IN A SUSPENDED POSITION

(71) Applicant: TIAMA, Vourles (FR)

(72) Inventors: Etienne Leprat, Sainte Foy les Lyon (FR); Arnaud Brosse, Lyons (FR)

(73) Assignee: TIAMA, Vourles (FR)

( * ) Notice: Subject to any disclaimer, the term of this patent is extended or adjusted under 35 U.S.C. 154(b) by 78 days.

(21) Appl. No.: 17/423,940

(22) PCT Filed: Jan. 22, 2020

(86) PCT No.: PCT/FR2020/050077
§ 371 (c)(1),
(2) Date: Jul. 19, 2021

(87) PCT Pub. No.: WO2020/152417
PCT Pub. Date: Jul. 30, 2020

(65) Prior Publication Data
US 2022/0097976 A1    Mar. 31, 2022

(30) Foreign Application Priority Data

Jan. 24, 2019 (FR) ..................................... 19 00617

(51) Int. Cl.
*B65G 19/02* (2006.01)
*B65G 21/20* (2006.01)
(Continued)

(52) U.S. Cl.
CPC ......... *B65G 19/025* (2013.01); *B65G 21/209* (2013.01); *G01N 21/9009* (2013.01); *B65G 23/04* (2013.01); *B65G 2201/0247* (2013.01)

(58) Field of Classification Search
CPC .... B65G 19/025; B65G 21/209; B65G 23/04; B65G 2201/0247; B65G 47/841; G01N 21/9009
See application file for complete search history.

(56) References Cited

U.S. PATENT DOCUMENTS 5,542,789 A * 8/1996 Aidlin .................. B65G 51/035
406/88
6,024,518 A * 2/2000 Ouellette ............. B65G 51/035
406/88

(Continued)

FOREIGN PATENT DOCUMENTS

EP    0 377 353    7/1990
EP    0 842 875    5/1998

(Continued)

*Primary Examiner* — Mark A Deuble
(74) *Attorney, Agent, or Firm* — Clark & Brody LP

(57) ABSTRACT

The invention relates to a method for conveying in translation, in a transport zone, glass containers (2) held in a suspended position between two slide rails on which slides a counter-ring (7) arranged on each container which has a ring surface (8) defining the opening of the container, the method consisting of ensuring the movement in translation of the containers (2) by a bearing surface (18*a*) of at least one belt (18) driven in translation and exerting mechanical pressure on each ring surface (8) of the containers (2) to create a bond by adherence between each ring surface (8) of the containers and the bearing surface (18*a*) of the belt.

19 Claims, 7 Drawing Sheets

(51) Int. Cl.
*G01N 21/90* (2006.01)
*B65G 23/04* (2006.01)

(56) References Cited

U.S. PATENT DOCUMENTS

| | | | | |
|---|---|---|---|---|
| 6,514,015 | B1 * | 2/2003 | Trenel | B65G 51/035 |
| | | | | 406/88 |
| 6,685,401 | B1 * | 2/2004 | de Almeida Rodrigues | |
| | | | | B65G 51/035 |
| | | | | 406/84 |
| 6,827,203 | B2 * | 12/2004 | Andreoli | B65G 51/035 |
| | | | | 198/836.3 |
| 7,861,852 | B2 * | 1/2011 | Klaiber | B65G 19/025 |
| | | | | 198/817 |
| 8,474,601 | B2 * | 7/2013 | Soncini | B65G 47/846 |
| | | | | 198/481.1 |
| 9,169,086 | B1 * | 10/2015 | Burchell | B65G 51/035 |
| 9,782,923 | B2 * | 10/2017 | Tanner | B65G 21/209 |

FOREIGN PATENT DOCUMENTS

| | | |
|---|---|---|
| FR | 2 581 045 | 10/1986 |
| FR | 2 846 314 | 4/2004 |
| WO | 97/10163 | 3/1997 |
| WO | 2007/028627 | 3/2007 |

\* cited by examiner

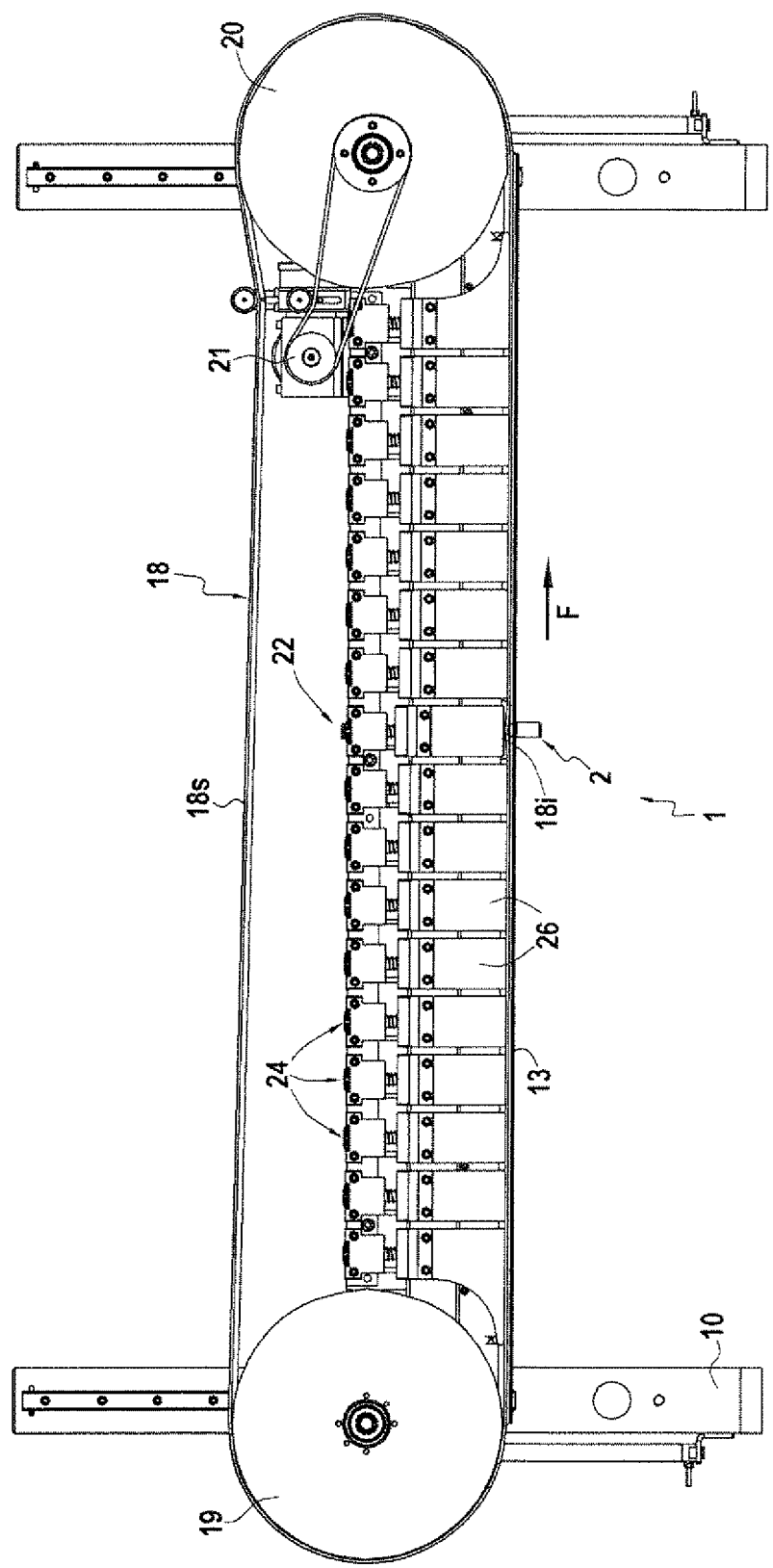
[Fig. 1]

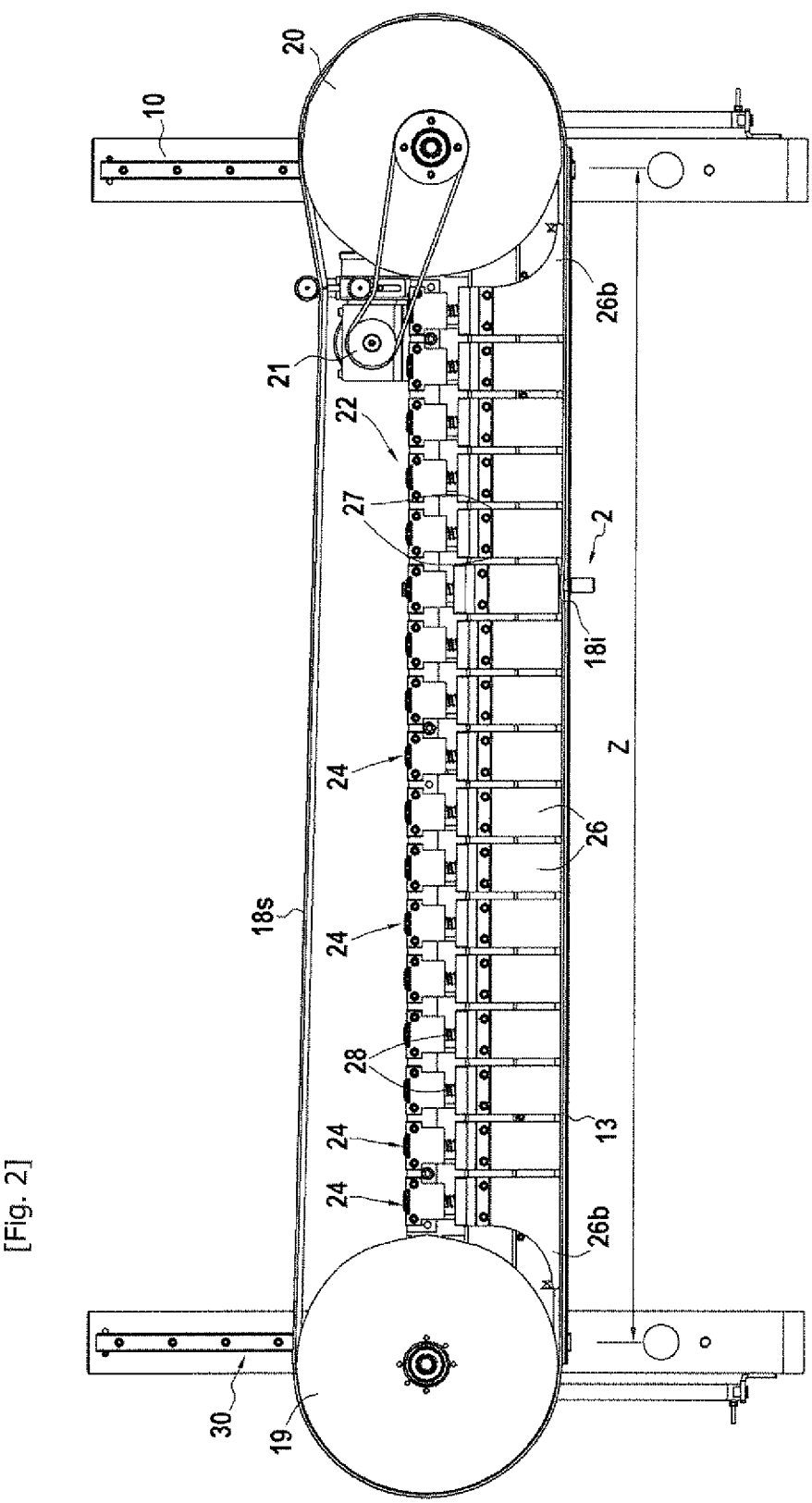
[Fig. 2]

[Fig. 3]
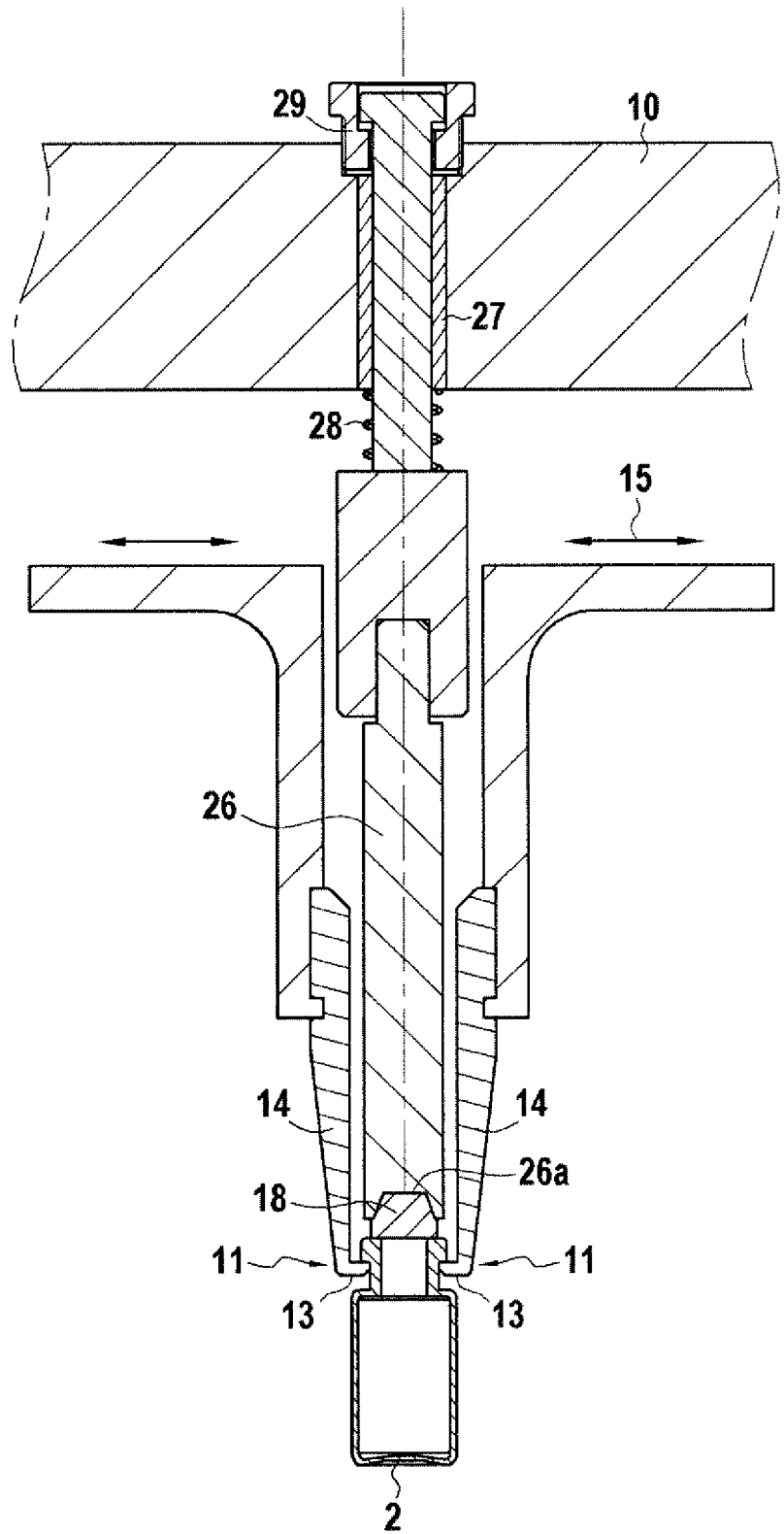

[Fig. 4]
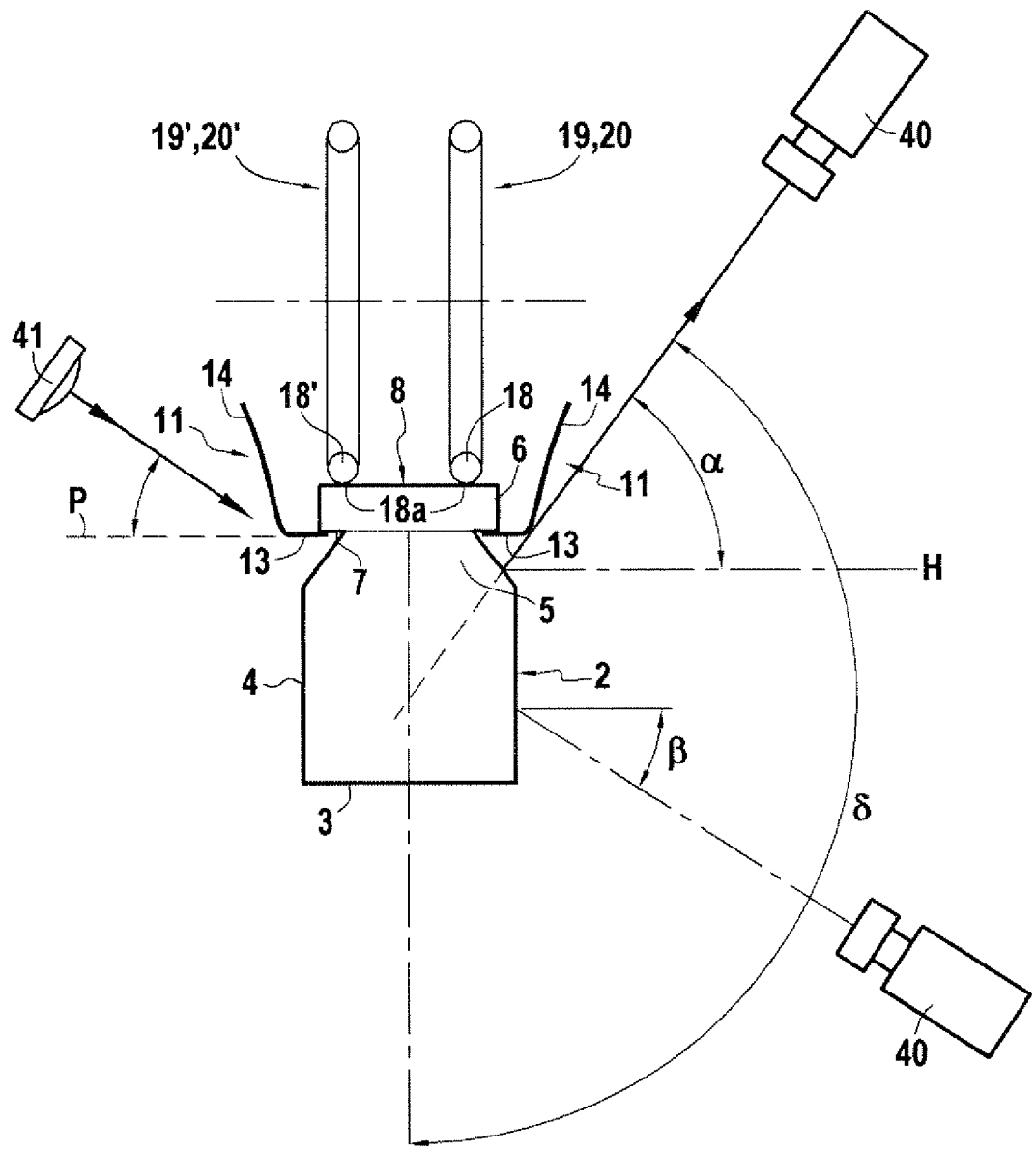
[Fig. 5]
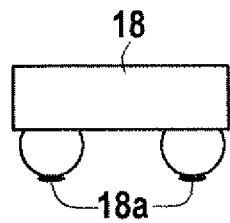

[Fig. 6]
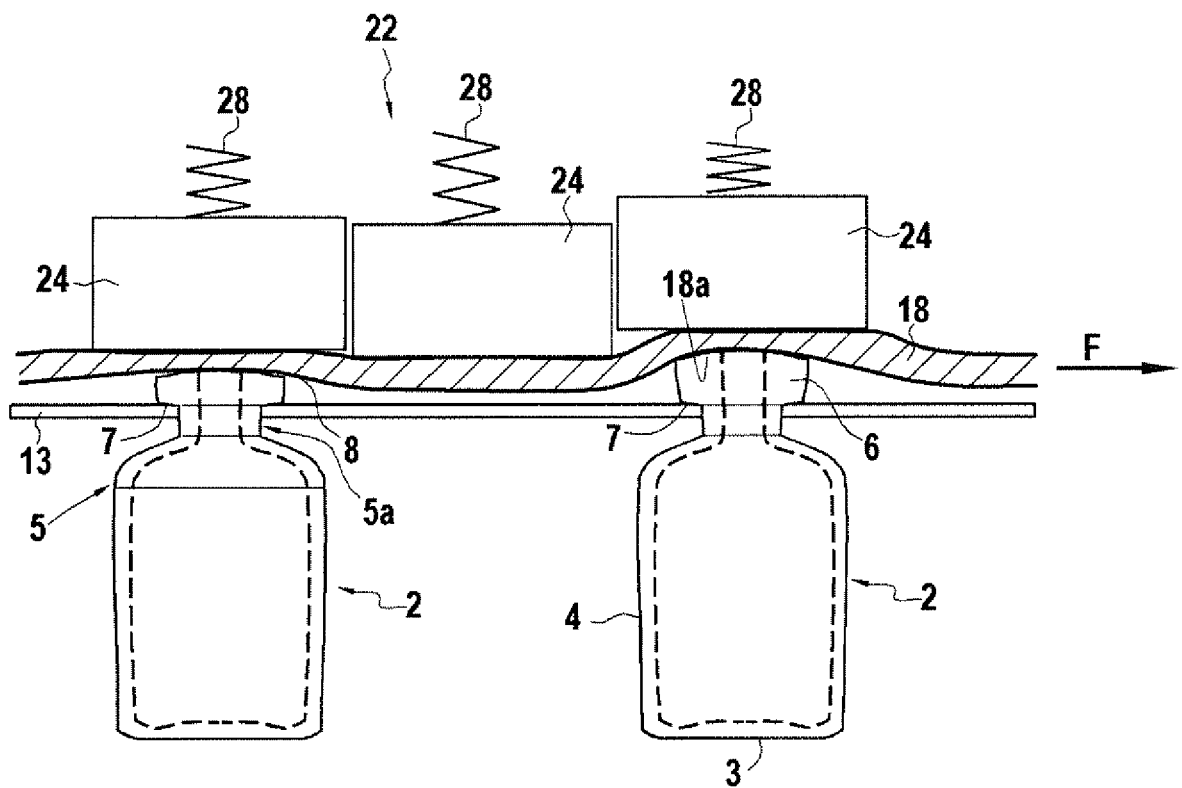
[Fig. 7]
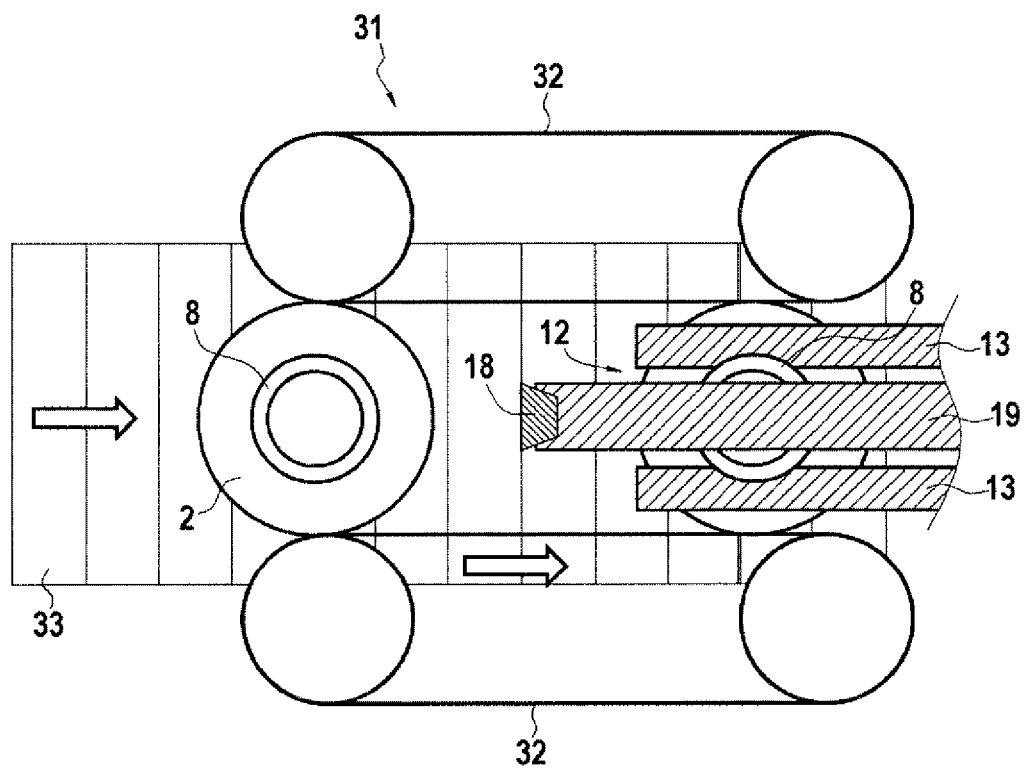

[Fig. 8]
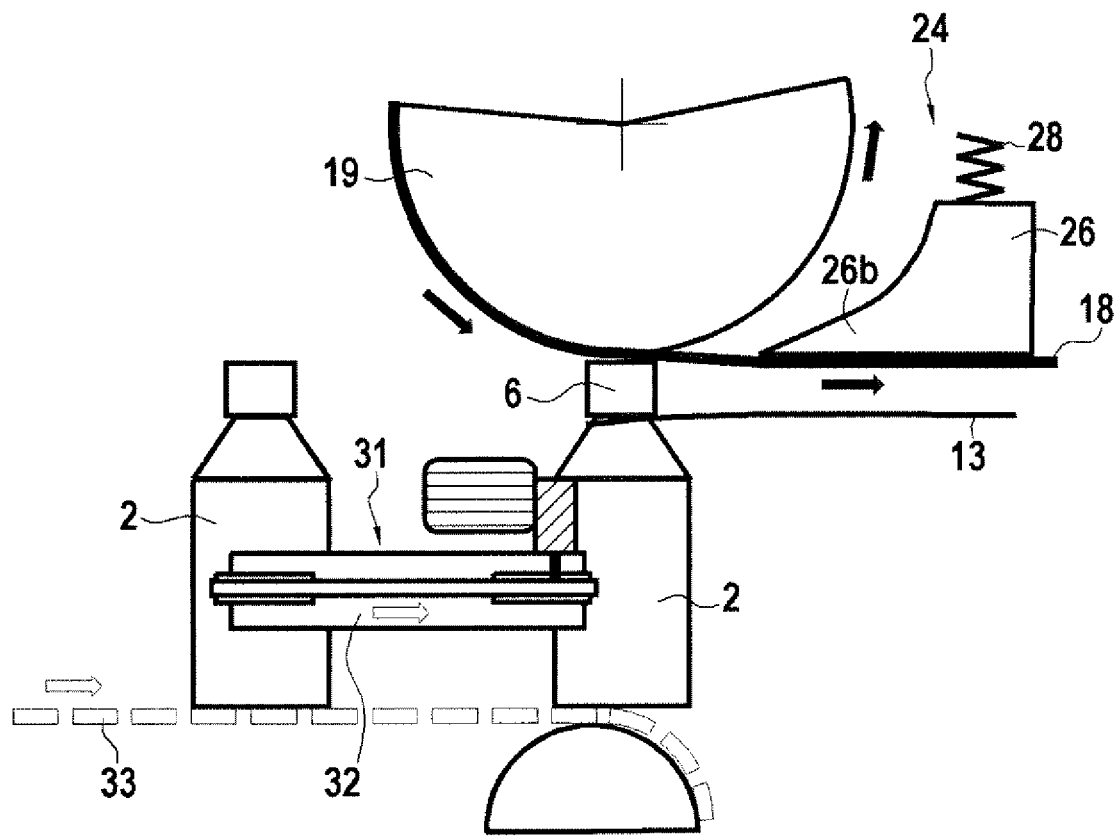
[Fig. 9A–9B]
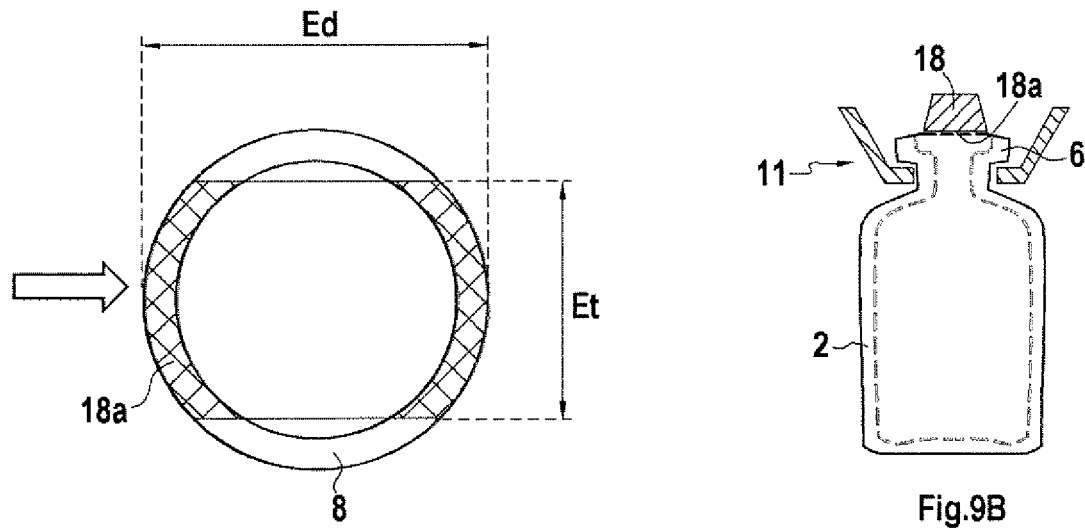
Fig.9A
Fig.9B

METHOD AND DEVICE FOR CONVEYING CONTAINERS IN A SUSPENDED POSITION

TECHNICAL FIELD

The present invention relates to the technical field of machines ensuring the scrolling in translation of containers in front of at least one and, generally, a series of stations for measuring, checking and/or inspecting of the containers.

The present invention finds a particularly advantageous application in the field of on-line measuring, checking or inspection of containers, such as for example bottles, jars or flasks made of glass.

PRIOR ART

In the technical field of measuring, checking or inspection of glass containers, the measuring, checking or inspecting machine includes a conveyor ensuring the scrolling of the containers before different measuring, checking or inspecting stations. According to a known exemplary embodiment, the conveyor appears in the form of a conveyor belt on which the containers rest on their bottoms. This mode of transporting the containers does not allow inspecting or checking the bottom of the containers.

A conveyor including a frame equipped with a drive system with two pairs of endless belts is also known, for example from patent FR 2 846 314. The two belts of a pair are mounted facing one another to define between them a path for gripping and moving the containers from one end to the other of the belts. Inasmuch as the holding and the transport of the containers take place on the body of the containers by means of belts, the checking, measuring or inspection cannot be carried out on the body of the containers.

In the field of transport of containers of plastic material, it is known to have recourse to aerial conveyors including two slide rails separated to define between them a translation path for the containers which are supported by their counter-ring bearing on the slide rails. A flow of air moves the containers which slide by their counter-ring on the slide rails. The transport of the containers in a suspended position leads to their swaying due to their low weight, which does not allow accomplishing accurate optical checking of the containers.

Patent FR 2 581 045 presents various transport solutions for lightweight containers made of PET suspended on an annular protrusion, having a function similar to the counter-ring of a glass bottle. Certain solutions presented consist of supporting the containers by endless belts below the counter-ring. These systems are bulky around the ring and the neck of the containers. According to one alternative illustrated in FIGS. 12 and 14, the containers are supported by slide rails below their counter-ring. Their movement is produced by fingers 76 which successively press the containers on the slide rails, said fingers being fixed on an endless belt. The disadvantage of this solution is that the movement of the containers is not precise. In fact, the containers simply rest on the slide rails, and they can freely vibrate or oscillate transversely or longitudinally during their movement.

Likewise, patent application WO 2007/028627 describes an installation for conveying bottle preforms of plastic material including a collar bearing on the slide rails. These preforms are driven in translation by means of endless belts in contact by friction on the two opposite sides of the preform, above the collar of the preform. In order to avoid the preforms dilating upward, a rail is placed above the preforms. An installation of this type has the same disadvantages as the other installations because the preforms are able to sway during their movement.

Patent application EP 0 842 875 describes an installation for conveying plastic bottles by means of two guides positioned on either side of the bottles and in contact with the lower surface and the upper surface of the flanges protruding from plastic bottles of this type. An installation of this type is exclusively suited to the conveying of plastic bottles having a protruding flange. Likewise, even if this solution allows limiting the swaying of the bottles during their movement, these bottles are not held in stable positions offering the possibility of accomplishing accurate optical checks on these bottles.

In other words, known solutions are bulky, on the one hand, and create imprecise movement of the containers on the other hand.

DISCLOSURE OF THE INVENTION

The present invention aims to correct the disadvantages of the prior art by proposing a new technique for transporting containers in translation in a suspended position to allow an inspection of the body, of the bottom and even of the shoulder of the containers, this technique ensuring transport of the containers in a stable position to allow the implementation of accurate checking, measuring and/or inspecting operations.

One object of the invention is to propose a method for conveying in translation, in a transport zone, glass containers held in a suspended position between two slide rails on which slides a counter-ring arranged on each container which has a ring surface defining the opening of the container, the method consisting of ensuring the movement in translation of the containers by a bearing surface of at least one belt driven in translation in a translation direction and exerting mechanical pressure on each ring surface of the containers in a direction substantially perpendicular to the direction of movement to create a bond by adherence between each ring surface of the containers and the bearing surface of the belt.

Moreover, the method according to the invention can further include in combination at least one and/or the other of the following additional features:
- According to one embodiment, mechanical pressure is applied over the entire length of the belt located in the transport zone, to create the bond by adherence between each ring surface of the containers and the bearing surface of the belt;
- According to another embodiment, mechanical pressure is applied by the pressurization sectors distributed within the transport zone to create, by means of the portion of the belt subjected to each pressurization sector the bond by adherence between each ring surface of the containers and the bearing surface (18a) of the belt;
- the belt ensures the simultaneous driving in the transport zone of several containers by creating for each of them the bond by adherence between each ring surface of the containers and the bearing surface of the belt;
- the belt and the slide rails take the containers in charge so as to be space from one another in order for the portion of the belt subjected to each pressurization sector to create a bond by adherence of the bearing surface of the belt to the ring surface of a single container;
- the pressurization sectors are distributed in the transport zone, to ensure the retention of the bond by adherence between each ring surface of the containers and the bearing surface of the belt, during the movement of the containers over the entire transport zone and in particular during the passage of the containers from one sector to the following sector;

the belt is guided vertically on the one hand, at the entry of the transport zone, so that the bearing surface of the belt progressively approaches the slide rails in order to ensure the engagement of the containers in the transport zone and, on the other hand, at the exit of the transport zone, so that the bearing surface of the belt progressively separates itself from the slide rails in order to ensure the exit of the containers from the transport zone;

the separation between the slide rails is adapted to ensure the guiding of the containers transversely relative to the translation direction of the containers.

Another object of the invention is to propose a conveyor for moving, in a transport zone, glass containers in a position suspended by a counter-ring arranged on each container which has a ring surface defining the opening of the container, the conveyor including:

two slide rails separated to define between them a translation path for the containers and to support the containers by their counter-ring, these slide rails being suitable for ensuring the sliding of the containers on their counter-ring;

at least one belt driven in translation in a translation direction and mounted overhanging the translation path, this belt having a bearing surface substantially parallel to the support plane defined by the slide rails and intended to be supported on the ring surfaces of the containers;

and a system exerting mechanical pressure on the belt in a direction substantially perpendicular to the movement direction to create a bond by adherence between each ring surface of the containers and the bearing surface of the belt to ensure the driving in translation of the containers suspended by their counter-ring which slides on the slide rails.

Moreover, the conveyor according to the invention can further include in combination at least one and/or the other of the following addition features:

the system exerting mechanical pressure exerts mechanical pressure with an elastic return;

the system which exerts mechanical pressure and the belt are adapted so that the extent of the bearing surface of the belt on the ring surface of the containers ensures the driving in translation of the containers;

the system exerting mechanical pressure on the belt includes pressurization sectors distributed in the transport zone to ensure the retention of the bond by adherence between each ring surface of the containers and the bearing surface of the belt all along the transport zone;

each pressurization sector includes a bearing body on the surface of the belt opposite to the bearing surface, this bearing body being guided in vertical movement and loaded by an elastic pressure system which is set in compression with no load by an adjustable down-stop;

the assembly including the belt and the system exerting mechanical pressure includes a vertical adjustment system allowing adjusting the vertical distance between the bearing surface of the belt and the slide rails so as to adapt itself to the height of the ring defined between the counter-ring and the ring surface;

each slide rail includes a linear guide rail from which rises a support, the width of the rails being dimensioned to support the containers by their counter-ring and to limit the distance between the neck and the support to the functional clearance allowing the sliding of the containers;

the slide rails include a system for adjusting their separation to ensure the guiding of the containers transversely relative to the translation direction of the containers, by adapting itself to the dimensions of the containers;

the belt is an endless belt mounted between two pulleys of which at least one is driven in rotation, this belt being guided vertically on the one hand, at the entry of the transport zone, to approach the slide rails by progressively descending in order to ensure the engagement of the containers in the transport zone and, on the other hand, to separate itself from the slide rails by progressively rising in order to ensure the exit of the containers from the transport zone.

Another object of the invention is to propose a checking, inspection and/or measuring installation including a conveyor conforming to the invention, for transporting glass containers in a stable position suspended by their counter-ring, this installation including at least one receiver and/or one emitter of electromagnetic radiation for the checking, the inspection and/or the measuring of at least a portion of the containers transported by the conveyor and located below the counter-ring.

According to the invention, the installation can further include in combination at least one and/or the other of the following additional features:

at least one receiver and/or one emitter is positioned to observe the shoulder, the body or the bottom of the containers with the optical axis having a plunging angle to a horizontal plane at the observed point on the optical axis greater than 45°.

BRIEF DESCRIPTION OF THE DRAWINGS

FIG. 1 is a side elevation view of an exemplary embodiment of a conveyor conforming to the invention, showing the movement of a container in the suspended position.

FIG. 2 is a view similar to FIG. 1, showing the evolution of the movement of the container relative to its position illustrated in FIG. 1.

FIG. 3 is a simplified view in transverse section of the conveyor illustrated in FIG. 1.

FIG. 4 is a transverse section view of another exemplary embodiment of a conveyor implementing two transport belts.

FIG. 5 is a transverse section view of another exemplary embodiment of a belt able to be implemented in a conveyor conforming to the invention.

FIG. 6 is a large-scale schematic explaining the principle for transporting the containers by the conveyor conforming to the invention.

FIG. 7 is a top view showing an exemplary embodiment of an upstream transport system ensuring bringing the containers to the conveyor conforming to the invention.

FIG. 8 is a front view showing the upstream transport system illustrated in FIG. 7 and ensuring bringing the containers to the conveyor conforming to the invention.

FIG. 9A is a top view of the ring surface of a container on which is shown the bearing surface of an exemplary embodiment of a belt, while FIG. 9B shows in section the belt illustrated in FIG. 9A supported on a container transported by the conveyor conforming to the invention.

FIG. 10A is a top view of the ring surface of a container on which is shown the bearing surface of another exemplary embodiment of a belt, while

FIG. 11A is a top view of the ring surface of a container on which is shown the bearing surface of another exemplary embodiment of a belt, while

DESCRIPTION OF THE EMBODIMENTS

Figure 10A:
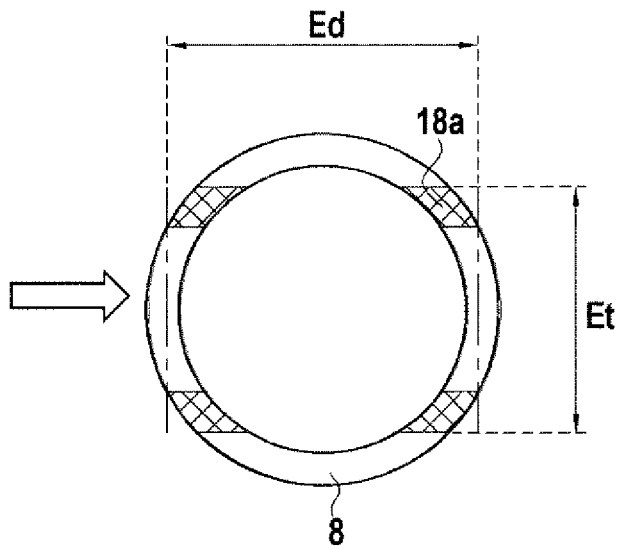

As shown by the drawings, the object of the invention relates to a conveyor 1 suited for moving, in a transport or conveying zone Z, containers 2 in a suspended position in a translation direction shown by the arrow F. Advantageously, the containers 2 are glass containers, preferably empty, such as bottles, flasks or jars. Conventionally, each container 2 has a bottom 3 topped by a body 4 continued by a shoulder 5 which connects, through a neck 5a, to a ring 6. Thus, the ring 6 is defined by a counter-ring 7 forming a flange protruding from the neck 5a. This counter-ring 7 serves in particular during the handling of the preform during forming, then as a hook for the closing devices. The ring 6 is defined opposite to the counter-ring 7, by a ring surface 8 defining the opening of the container. This ring surface 8 is generally flat, semi-toroidal or frusto-conical and serves in many cases for sealing with the seal of the cover , the capsule or the screw cap. The ring 6 of the containers 2 is therefore defined between the counter-ring 7 and the ring surface 8. The height of the ring 6 is then the vertical distance between the counter-ring 7 and the ring surface 8.

The conveyor 1 includes a frame 10 supporting two slide rails 11 separated to define between themselves a translation path 12 of the containers. More precisely, each slide rail 11 includes a linear guide rail 13 from which rises a support 14 attached to the frame 10. The rails 13 are mounted parallel with one another while being located in the same horizontal support plane P to constitute a flat surface for support and guiding in translation of the containers. More precisely, the rails 13 are separated to allow passage between them of the neck 5a of the containers, while the counter-ring 7 of the containers is supported on the rails 13.

It must be understood that the slide rails 11 are suitable for ensuring that the counter-ring 7 of the containers slides on these slide rails during their transport. Of course, the slide rails and in particular the rails 13 have tribological properties allowing sliding with little friction of the counter-ring 7 and abrasion resistance properties. These tribological properties and the abrasion resistance properties of the sliding surfaces of the slide rails 11 are inherent or added by surface treatments or coatings applied to the rails.

According to an advantageous embodied feature, the width of the rails 13 is dimensioned to support the containers 2 by their counter-ring 7 while limiting the transverse distance between the neck 5a and the support 14 to within the functional clearance allowing the sliding of the containers. An arrangement of this type allows limiting the width of the slide rails 11 and consequently increasing the angular extent of the optical inspection of the container, as will be explained in detail in the continuation of the description. In the same vein, it should be noted that the supports 14 are extended vertically.

According to one advantageous embodied feature, the slide rails 11 include a system 15 for adjusting their separation to allow adjusting the width of the translation path 12 of the containers to allow adaptation to the diameter of the necks 5a of the containers 2. Likewise, the width of the translation path 12 is adjusted so that the rails 13 can support the containers 2 by their counter-ring 7 all along their trajectory without risking falling through the translation path 12. Advantageously, this adjusting system 15 adjusts the separation between the rails 13 to ensure, during the movement of the containers, the guiding of the containers transversely relative to the translation direction F of the containers 2. Typically, the separation between the rails 13 corresponds to the diameter of the neck of the containers, within the functional clearance, and is less than the diameter of the counter-ring in order to support the containers.

Advantageously, a system 15 for adjusting the separation allows symmetrical separation of the slide rails 11. This adjusting system 15 can be produced by any appropriate means, such as for example by means of screw-nut systems mounted between the supports 14 of the rails and the frame 10. The adjusting system 15 can also include for example transverse endless screws, bearings and sleeves for horizontal guiding, cranks or electrical or pneumatic actuators, means for blocking in position, these systems preferably being located at the ends or outside the transport zone Z.

According to another feature of the invention, the conveyor 1 includes at least one belt 18 driven in translation and mounted overhanging the translation path 12. As is more precisely revealed by FIGS. 1 and 2, the conveyor 1 includes an endless belt 18, mounted between two pulleys 19, 20 the axes of which are supported by the frame 10. At least one of the pulleys, namely the pulley 20 in the example illustrated, is driven in rotation by a gearmotor 21 of any known type, carried by the frame. The belt 18 thus includes an upper strand 18s and a lower strand 18i. The pulleys 19, 20 are mounted so that the lower strand 18i of the belt extends overhanging the translation path 12 and in particular above the level of the rails 13, as will be understood in the continuation of the description. The lower strand 18i of the belt moves in the translation direction F, parallel to the rails 13.

More precisely, this belt 18 has an outer surface opposite to the internal surface which is considered as coming into contact with the pulleys 19, 20. The outer surface of the lower strand 18i of the belt is turned in the direction of the rails 13 and of the ring surface 8 rising above the rails. One portion of this outer surface of the lower strand 18i, called the bearing surface 18a in the continuation of the description, is intended to be supported on the ring surfaces 8 of the containers 2 when the latter are supported by the counter-ring 7 on the rails 13. This bearing surface 18a is substantially parallel to the support plane P defined by the slide rails.

According to an advantageous variant embodiment, the bearing surface 18a of the belt is flat. It can be smooth, or alternatively textured, for example with spikes or ribs as illustrated in FIG. 5, which shows a belt including two ribs. Relief features of this type have the objective of maintaining adherence despite ring surfaces that are sometimes not perfectly flat. The belt 18 can have a hardened portion for the bearing surface 18a. The belt 18 can have, for example, a trapezoidal, rectangular or round cross section of the "polycord" type. Of course, having available a range of several belts of different widths can also be contemplated.

The conveyor 1 also includes a system 22 exerting mechanical pressure on the belt 18 in a direction substantially perpendicular to the movement direction to create a bond by adherence between each ring surface 8 of the containers 2 and the bearing surface 18a of the belt, to ensure the driving in translation of the containers suspended by their counter-ring 7 which slides on the slide rails 11. The mechanical pressure exerted on the belt 18 is such that its portion in contact with the ring surface 8, called the bearing surface 18a, adheres to it to create a bond by adherence, driving the container in translation. It must be understood that the bearing surface 18a designates, on the belt, regardless of its material constitution, the surface of the belt having as its function to press on the ring surface 8.

The system 22 is adapted to create, between the belt and the container, a bond, not by obstacle but by adherence or friction. Conventionally, a bond by adherence is a bond in which the phenomena of friction and adherence oppose the elimination of the bond. The mechanical action of the belt 18 on the ring surface comprises a vertical component, normal to the surface of the ring, which therefore constitutes the support, and horizontal friction component, therefore parallel to the support plane P, which therefore causes the driving, the movement of the containers. The bond is free of sliding, therefore the belt 18 and the ring surface 8 which are in contact move in the same direction, without sliding. Consequently, the speed of the belt is equal to the translation speed of the containers. The vertical component of the action, which is distributed over the ring surface, also has the effect of pressing the counter-ring onto the rails, therefore the counter-ring remains, during the movement, parallel to the support plane P. Thus, the movement of the containers is a pure and precise translation within the functional clearances. As the mechanical action of the belt is distributed over the bearing surface 18a, it is called a pressure.

Each container 2 is thus driven in translation by the belt 18, with its ring surface 8 adhering to the bearing surface 18a of the belt while the counter-ring 7 slides on the rails 13. The ring 6 of each container 2 is subjected, on the side of its ring surface 8, to a pressure leading to its bonding with the belt 18 and, on the side of its counter-ring 7, to a pressure allowing sliding of the counter-ring on the rails 13. The pressure exerted by the belt 18 maintains the contact of the counter-ring 7 on the rails 13 while considering that the reaction of the rails leads to the suspension of the container on the rails 13. It must be understood that each container 2 is thus translated, in a transport zone Z, in a stable suspended position, without deflection or pivoting movements, in view of the retention of the container in forced bearing on the rails. In other words, the ring 6 of the container is held clamped between the belt 18 and the rails 13 during the translation.

Figure 11A:
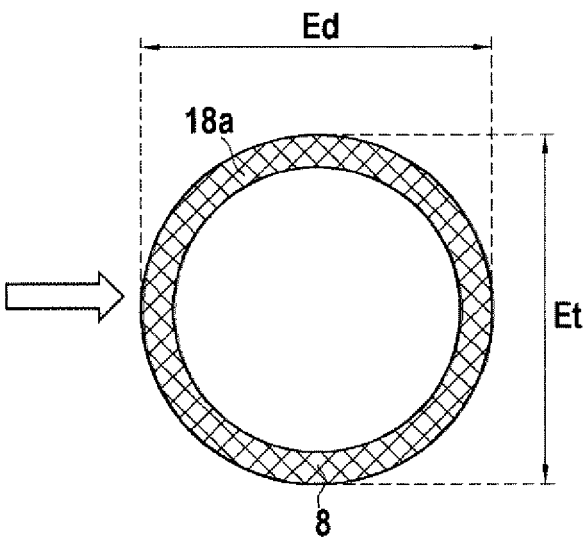

Advantageously, the system 22 which exerts mechanical pressure on the belt 18 is adapted so that the extent of the bearing surface 18a of the belt on the ring surface 8 of the containers ensures a translation of the containers, in a stable suspended position. Typically, the zone of the ring surface 8 on which the pressure is exerted is such that the bearing of the counter-ring 7 on the rails allows a preferably stable positioning, vertical or substantially vertical, of the containers during transport. Thus, as shown in FIG. 9A, 10A, 11A, the longitudinal extent Ed of the bearing surface 18a of the belt with the ring surface 8, taken in the translation direction, is sufficiently large to obtain a bond by adherence and a distribution of the pressure to ensure a stable bearing of the counter-ring 7 on the rails 13. Likewise, the bearing surface 18a of the belt is distributed transversely, along a transverse extent Et, on the ring surface 8, to ensure a stable bearing of the counter-ring 7 on the rails 13.

In the exemplary embodiments illustrated in FIG. 9A and 11A, the longitudinal extent Ed of the bearing surface 18a of the belt with the ring surface 8 is equal to the diameter of the ring surface 8, while in the example illustrated in FIG. 10A, the longitudinal extent Ed is slightly less than the diameter of the ring surface 8. In the exemplary embodiments illustrated in FIG. 9A and 10A, the transverse extent Et of the bearing surface 18a of the belt with the ring surface 8 is slightly less than the diameter of the ring surface 8, while in the example illustrated in FIG. 11A, the transverse extent Et is equal to the diameter of the ring surface 8. It should be noted that the transverse extent Et of the bearing surface 18a of the belt with the ring surface is continuous in the example illustrated in FIG. 9A and discontinuous is in the example illustrated in FIG. 10A, i.e. interrupted and composed of two disjoint zones. Typically, the transverse extent Et of the bearing surface 18a extends symmetrically with respect to the axis of symmetry of the container.

Figure 10B:
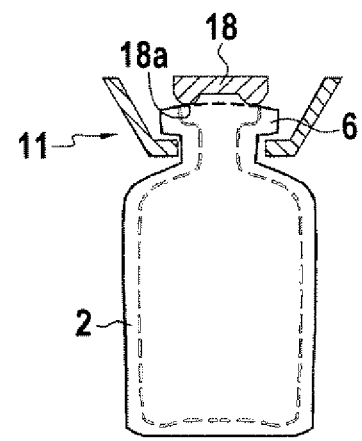
FIG. 10B shows in section the belt illustrated in FIG. 10A supported on a container transported by the conveyor conforming to the invention.
Figure 11B:
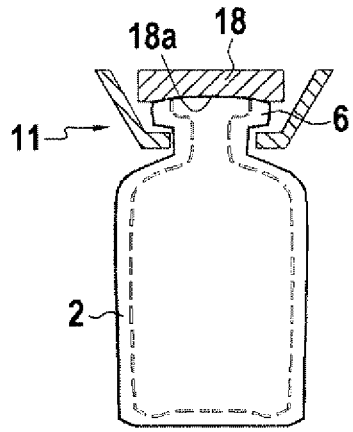
FIG. 11B shows in section the belt illustrated in FIG. 11A supported on a container transported by the conveyor conforming to the invention.

Of course, the width of the belt 18 is suited to the width of the ring surfaces 8 of the containers and to the selection of the extents Et, Ed of the bearing surface 18a of the belt with the ring surface. In the exemplary embodiment illustrated in FIG. 9A and 9B, the belt has a width slightly less than the diameter of the ring surface 8, while in the exemplary embodiment illustrated in FIG. 11A and 11B, the belt 18 has a width greater than the diameter of the ring surface 8 of the container. In the exemplary embodiment illustrated in FIG. 10A and 10B, the belt 18 has two ribs as illustrated in FIG. 5, allowing the discontinuous bearing surface 18a to be obtained.

According to another variant embodiment, the conveyor 1 can include two belts 18, 18' allowing the discontinuous bearing surface illustrated in FIG. 10A to be obtained. According to this variant embodiment illustrated in FIG. 4, the two belts 18, 18' are positioned symmetrically with respect to the plane of symmetry passing through the middle of the rails 13. Thus each of the belts 18, 18' has a limited width with respect to the diameter of the ring surface 8. The belts 18, 18' are positioned so that the bearing surface of the belts 18, 18' extends on either side of the axis of symmetry of the container. Each belt 18, 18' is mounted on a pair of pulleys 19, 19'-20, 20' in which one pulley of each pair includes a common system for driving in rotation. It can naturally be provided that the separation between the belts 18, 18' is adjusted depending on the dimensions of the ring surface of the containers.

According to an advantageous embodied feature, the system 22 exerting mechanical pressure on the belt 18 exerts mechanical pressure with elastic return. It must be understood that the system 22 exerts mechanical pressure on the belt when a container 2 is located between the belt 18 and the slide rails 11 as illustrated in FIG. 7. With no load, i.e. in the absence of a container 2 between the belt and the slide rails, this system 22 exerts little or no mechanical pressure on the belt. Thus, the mechanical pressure system 22 is able to occupy either a is working position for which it creates a bond by adherence between each ring surface 8 of the containers 2 and the bearing surface 18a of the belt, or a rest position by exerting little or no pressure on the belt in the absence of a container. The passage from the rest position to the working position is accomplished automatically by the engagement of the ring 6 between the rails 13, and the system 22 exerting the pressure opposing the lifting action created by the engagement of the ring 6. The passage from the working position to the rest position is accomplished automatically by the disengagement of the ring 6 from the rails 13 so that the system 22 returns to its rest position by the elastic return effect.

Of course, the rest position is such that the belt 18 is positioned relative to the rails 13, at a height less than the height of the ring 6 of the containers 2. The engagement of the ring 6 between the rails 13 and the system 22 exerting the pressure leads to separate from the rails the system 22 exerting the pressure, leading to the application on the belt 18 of mechanical pressure suited for creating the bond by adherence. It is therefore the ring 6 of the container 2 which lifts the belt and consequently the mechanical pressure system 22.

The system 22 exerting mechanical pressure on the belt 18 can be produced in different ways. In the exemplary embodiment illustrated in FIGS. 1 to 3, the system 22 exerting mechanical pressure on the belt includes pressurization sectors 24 distributed in the transport zone Z, to ensure the retention of the bond by adherence between each ring surface 8 of the containers and the bearing surface 18a of the belt all along the transport zone. These pressurization sectors 24 are distributed in a fixed manner along the belt, the lower strand 18i of which scrolls in front of these pressurization sectors 24. As is clearly revealed by FIGS. 1 and 2, the pressurization sectors 24 are positioned side by side while being separate so as to ensure the retention of the bond by adherence between each ring surface 8 of the containers and the bearing surface 18a of the belt, during the movement of the containers over the entire transport zone, but also during the passage of the containers 2 from one sector 24 to the following sector 24.

The pressurization sectors 24 are in contact with the lower strand 18i of the belt through the inner surface of the belt. At this location, the mechanical action of the sectors on the inner surface of the belt 18 comprises a vertical component, which therefore constitutes the support, and a horizontal friction component. There is therefore sliding, the belt moving horizontally, but not the pressurization sectors 24 which can only move vertically under the combined effect of the belt and of the elastic return. As the mechanical action of the pressurization sectors 24 is distributed over a contact surface, it is called a pressure.

Thus, the pressurization sectors 24 are dimensioned so that each sector creates a bond by adherence between a single ring surface 8 and the bearing surface 18 of the belt. In other words, a sector 24 exerts a maximum pressurization one container. Thus, each sector 24 is dimensioned to ensure for itself alone, the adherence with a single container at the same time. Moreover, the conveyor takes charge of the containers 2 with a determined spacing pitch in order that at most one pressurization sector 24 acts on a container 2. It is to be noted that the pressurization sectors 24 are independent from one another. Hence along the lower strand 18i, the belt is lifted in places in the presence of a container, and lowered in places in the absence of a container, therefore along the lower strand 18l the belt is in the rest position in certain sections and in the working position in others.

During the translation of the containers 2 by the belt 18, the bearing surface 18a of the belt will progressively leave one pressurization sector 24 while engaging progressively under the following pressurization sector 24 (FIG. 6). It follows that the transport of the containers 2 is ensured even during passage from one sector 24 to another.

It should be noted that, instead of implementing successive pressurization sectors 24, provision can be made to apply mechanical pressure over the entire length of the belt 18 located in the transport zone, to create the bond by adhesion between each ring surface 8 of the containers and the bearing surface 18a of the belt. For example, the system 22 for exerting mechanical pressure on the belt 18 can include a chamber or a set of chambers for confining a gas mixture in which a portion of the wall acts directly or indirectly on the belt 18. Alternatively, the system 22 for exerting mechanical pressure on the belt can includes a body or several bodies of elastic foam which press directly or preferably indirectly on the belt 18.

The system 22 for exerting mechanical pressure on the belt 18 allows the bearing surface of the belt lifted by each container 2 to remain in contact for all the containers, considering that there exist gaps in the height of the ring 6 from one container to another. In other words, the system 22 adapts to variations in the height of the ring 6 while always maintaining a pressure of the bearing surface on the ring surface throughout the entire trajectory traveled by each container.

According to a variant embodiment illustrated more precisely in FIG. 3, each pressurization sector 24 includes a bearing body 26 intended to be supported on the inner surface of the belt 18, opposite to the outer surface adapted to constitute the bearing surface 18a. For example, each bearing body 26 is provided, on its lower face, with a groove 26a for guiding the belt 18 in translation.

This bearing body 26 is guided in vertical movement and is loaded by an elastic pressure system 28. According to the variant embodiment illustrated in FIG. 3, the means for guiding the bearing body 26 in vertical movement consists of slides 27 carried by the frame 10. With no load, i.e. in its rest position when no container is located facing the bearing body 26, the elastic pressure system 28 is set in compression by an adjustable down-stop 29. In its working position, the bearing body 26 exerts a vertical pressure on the belt, i.e. a pressure in a direction substantially perpendicular to the horizontal movement direction T.

In the example illustrated, the elastic pressure system 28 is a compression spring, but a gas cylinder or polymer foam can be provided for producing a system of this type. The down-stop 29 positions the bearing body 26 in its rest position when no container is located facing the bearing body 26, this rest position being lower than the loaded position when a container is located facing the bearing body 26.

According to an advantageous variant embodiment, the conveyor 1 includes a vertical adjustment system 30 allowing adjusting the vertical distance between the bearing surface 18a of the belt and the slide rails 11 so as to adapt itself to the height of the ring of the containers, corresponding to the distance between the counter-ring 7 and the ring surface 8. To this end, the set consisting of the pulleys 19, 20 supporting the belt and the sectors 24, is assembled to constitute an assembly that can be displaced vertically with respect to the slide rails 11. Typically, the assembly consisting of the pulleys 19, 20, the belt 18 and the sectors 24 are assembled movable vertically on the vertical slides carried by the frame 10.

Moreover, the slide rails 11 are adjustable in vertical position to cause the rails 13 to correspond to the position of the counter-ring 7, depending on the height of the containers. In fact, the containers are generally brought to the conveyor by means of stacked chain conveyors or pallets on which the containers rest on their bottoms. According to one variant, the entire conveyor 1 is adjustable in height depending on the height of the containers 2 to be transported.

The preceding description reveals that the conveyor 1 ensures the movement in translation of the containers 2 through a bearing surface 18a of at least one belt 18 driven in translation and exerting mechanical pressure on each ring surface 8 of the containers to create a bond by adherence between each ring surface of the containers and the bearing surface 18a of the belt.

Advantageously, the belt 18 ensures the simultaneous driving, in the transport zone Z, of several containers 2 by creating for each of them the bond by adherence between each ring surface 8 of the containers and the bearing surface 18a of the belt. In other words, several containers are transported simultaneously in the conveying zone Z.

As described above, it should be noted that the conveyor 1 takes charge of the containers 2 so as to be spaced from one another in order that the portion of the belt subjected to each pressurization sector 24 creates a bond by adherence of the bearing surface 18a of the belt on the ring surface 8 of a single container. In other words, the number of containers 2 moved simultaneously is equal, at most, to the number of pressurization sectors 24. In the case where mechanical pressure is applied over the entire length of the belt 18, the number of containers 2 moved simultaneously depends on the selected spacing between the containers 2.

It should be noted that the containers 2 are brought to the conveyor 1 conforming to the invention by a transport system of any type known per se, called an entry system, and are transferred from the conveyor by a transport system of any type known per se, called an exit system. FIGS. 7 and 8 illustrate an exemplary embodiment of an entry system 31 bringing the containers one by one to the entry of the conveyor 1, i.e. by introducing the containers at one of the ends of the slide rails 11. The exit of the conveyor 1 is also equipped with an exit system retrieving the containers leaving the conveyor 1 one by one. An exit system of this type, not shown, is similar to or different from the entry system of the conveyor.

According to the exemplary embodiment illustrated, the entry system 31 includes two endless webs 32 mounted facing one another and spaced to take charge of each container resting on its bottom on a conveyor belt 33, so that the two endless webs 32 clamp each container at their body, the ring remaining free to allow the conveyor 1 to take charge of it downstream. In fact generally, in the factories for production of glass containers or filling plants, the containers are transported on conveyors using conveyor belts 33. The transport web 33 can be composed of any type such as woven webs, belts or chains of various shapes. The endless belts 32 are adapted to engage each container 2 between the slide rails 11 and being the counter-ring 7 into bearing on the rails 13. Typically, each container 2 is dropped at the end of the slide rails, which is established substantially overhanging the axis of rotation of the return pulley 19 of the belt 18. Each container 2 is then moved in translation by the belt 18 as explained previously.

Advantageously, the belt 18 is guided vertically on the one hand, at the entry of the transport zone Z, to progressively approach the slide rails 11 in order to ensure the engagement of the containers in the transport zone and, on the other hand, at the exit of the transport zone Z, to progressively separate itself from the slide rails 11 in order to ensure the exit of the containers rom the transport zone Z. As is revealed more precisely by FIGS. 1, 2 and 8, each pressurization sector 24 located at the ends of the conveyor 1 is arranged to exert a pressure on the portion of the belt which unwinds downstream of the pulley 19 or on the portion of the belt that is wound upstream of the pulley 20.

To this end, each pressurization sector 24 located at the two ends of the conveyor 1 includes a bearing bead 26b inserted below each pulley 19, 20.

Thus the object of the invention offers a new method of conveying in translation for glass containers, in a stable suspended position. This method consists of ensure the movement in translation of the containers 2 through a bearing surface 18a of at least one belt 18 driven in translation and exerting mechanical pressure on each ring surface 8 of the containers 2 to create a bond by adherence between each ring surface 8 and the bearing surface 18a of the belt.

The conveyor 1 conforming to the invention finds a particularly advantageous application for a checking, inspection or measuring installation for glass containers. The conveyor 1 allows transporting glass containers in a stable position suspended by their counter-ring 7 in the observation field of at least one given electromagnetic radiation receiver called the sensor 40, and/or in the irradiation field of a given electromagnetic radiation source called the emitter 41, the sensor 40 and the emitter 41 can be positioned fixedly at any locations of the transport zone Z. A sensor 40 or an emitter 41 allow the checking, the inspection and/or the measuring of at least a portion of the transported containers located below the counter-ring 7. Thus, the conveyor 1 has the particular feature of allowing inspection of the bottom 3, of the body 4 and even of the shoulder 5 of the containers, including containers of small size such as 5 ml pharmaceutical flasks for injectable. Typically, the sensors 40 are optical sensors operating in a UV, visible or infrared spectrum i.e. image sensors, and they are equipped with objectives the optical axis of which defined an observation direction. As illustrated in FIG. 4, at least one sensor 40 is positioned to observed the shoulder or the body or the bottom of containers with the optical axis having a plunging angle $\alpha$ to a horizontal plane H at the observed point on the optical axis, which is a maximum, for example $\alpha$ is greater than 45°, even 85°. Likewise, radiation sources, for example light sources 41, located above the plane of the ring of the containers can illuminate the shoulder, the body or the bottom with maximum plunging angles $\alpha$. The same will therefore be true of the possible counter-plunging angles $\beta$ between 0 and 90° with respect to the horizontal. Finally, the conveyor 1 leaves a large volume below, but especially above the plane passing through the counter-ring 7, this volume being defined above the counter-ring 7 only by slide rails 11 which are designed to be as narrow as possible transversely to the movement. This available volume can receive electromagnetic radiation receivers 40 and sources of electromagnetic radiation 41. In other words, the conveyor 1 offers an angular optical inspection extent of the container $\delta$ as large as possible, exceeding if necessary 135° or even 175°.

The conveyor 1 allows transporting glass containers in a stable suspended position, i.e. in a pure and precise translation movement. Stability is guaranteed in particular by the clamping of the containers between the rails and the belt. This makes it possible, for example, to know the position of the containers in the field of a receiver. This also allows linking together the successive observations of a container passing through the successive fields of several receivers, with a known movement of the container passing through successive fields.

The conveyor 1, by the precision of the movement generated and the free space left around the containers, can find other applications than the checking, the inspection or the measuring of glass containers.

The invention claimed is:

1. A method for conveying in translation, in a transport zone (Z), glass containers (2) held in a suspended position between two slide rails (11) on which slides a counter-ring (7) arranged on each container which has a ring surface (8) defining the opening of the container, the method consisting of ensuring the movement in translation of the containers (2) by a bearing surface (18a) of at least one belt (18) driven in translation in a translation direction and exerting mechanical pressure on each ring surface (8) of the containers (2) in a direction substantially perpendicular to the direction of movement to create a bond by adherence between each ring surface (8) of the containers and the bearing surface (18a) of the belt.

2. The method according to claim 1, according to which mechanical pressure is applied over the entire length of the belt (18) located in the transport zone (Z) to create the bond by adherence between each ring surface (8) of the containers (2) and the bearing surface (18a) of the belt.

3. The method according to claim 1, according to which mechanical pressure is applied by pressurization sectors (24) distributed within the transport zone (Z), to create, by means of the portion of the belt subjected to each pressurization sector (24), the bond by adherence between each ring surface (8) of the containers (2) and the bearing surface (18a) of the belt.

4. The method according to claim 1, according to which the belt (18) ensures the simultaneous driving, in the transport zone (Z), of several containers (2) by creating for each of them the bond by adherence between each ring surface (8) of the containers (2) and the bearing surface (18a) of the belt.

5. The method according to claim 3, according to which the belt (18) and the slide rails (11) take the containers (2) in charge so as to be spaced from one another in order for the portion of the belt subjected to each pressurization sector to create a bond by adherence of the bearing surface (18a) of the belt (18) to the ring surface (8) of a single container.

6. The method according to claim 3, according to which the pressurization sectors (24) are distributed in the transport zone (Z), to ensure the retention of the bond by adherence between each ring surface (8) of the containers and the bearing surface (18a) of the belt, during the movement of the containers (2) over the entire transport zone (Z) and in particular during the passage of the containers from one sector (24) to the following sector (24).

7. The method according to claim 1, according to which the belt (8) is guided vertically on the one hand, at the entry of the transport zone (Z), so that the bearing surface (18a) of the belt (18) progressively approaches the slide rails (11) in order to ensure the engagement of the containers (2) in the transport zone (Z) and, on the other hand, at the exit of the transport zone, so that the bearing surface (18a) of the belt (18) progressively separates itself from the slide rails (11) in order to ensure the exit of the containers from the transport zone.

8. The method according to claim 1, according to which the separation between the slide rails (11) is adapted to ensure the guiding of the containers (2) transversely relative to the translation direction of the containers.

9. A conveyor for moving, in a transport zone, glass containers (2) in a position suspended by a counter-ring (7) arranged on each container (2) which has a ring surface (8) defining the opening of the container, the conveyor including:

two slide rails (11) separated to define between them a translation path (12) of the containers (2) and to support the containers by their counter-ring (7), these slide rails (11) being suitable for ensuring the sliding of the containers on their counter-ring;

at least one belt (18) driven in translation in a translation direction and mounted overhanging the translation path (12), this belt (18) having a bearing surface (18a) substantially parallel to the support plane (P) defined by the slide rails and intended to be supported on the ring surfaces (8) of the containers (2);

and a system (22) exerting mechanical pressure on the belt (18) in a direction substantially perpendicular to the direction of movement to create a bond by adherence between each ring surface (7) of the container and the bearing surface (18a) of the belt (18) to ensure the driving in translation of the containers suspended by their counter-ring (8) which slides on the slide rails (11).

10. The conveyor according to claim 9, according to which the system (22) exerting mechanical pressure exerts mechanical pressure with an elastic return.

11. The conveyor according to claim 9, according to which the system (22) which exerts mechanical pressure and the belt (8) are adapted so that the extent of the bearing surface (18a) of the belt (18) on the ring surface (8) of the containers ensures the driving in translation of the containers (2).

12. The conveyor according to claim 9, according to which the system (22) exerting mechanical pressure on the belt (18) includes pressurization sectors (24) distributed in the transport zone (Z), to ensure the retention of the bond by adherence between each ring surface (8) of the containers (2) and the bearing surface (18a) of the belt (18) all along the transport zone.

13. The conveyor according to claim 12, according to which each pressurization sector (24) includes a bearing body on the surface of the belt opposite to the bearing surface, this bearing body being guided in vertical movement and loaded by an elastic pressure system which is set in compression with no load by an adjustable down-stop (29).

14. The conveyor according to claim 9, according to which the assembly includes the belt (18) and the system exerting mechanical pressure (22) includes a vertical adjustment system (30) allowing adjusting the vertical distance between the bearing surface of the belt and the slide rails (11) so as to adapt itself to the height of the ring (5) defined between the counter-ring and the ring surface.

15. The conveyor according to claim 9, according to which each slide rail (11) includes a linear guide rail (13) from which rises a support (14), the width of the rails being dimensioned to support the containers by their counter-ring and to limit the distance between the neck and the support to the functional clearance allowing the sliding of the containers.

16. The conveyor according to claim 9, according to which the slide rails (11) include a system for adjusting (15) their separation, to ensure the guiding of the containers transversely relative to the translation direction of the containers, by adapting itself to the dimensions of the containers.

17. The conveyor according to claim 9, according to which the belt (18) is an endless belt mounted between two pulleys (19, 20) of which at least one is driven in rotation, this belt being guided vertically on the one hand, at the entry of the transport zone, to approach the slide rails (11) by progressively descending in order to ensure the engagement of the containers in the transport zone and, on the other hand, at the exit of the transport zone, to separate itself from the slide rails (11) by progressively rising in order to ensure the exit of the containers from the transport zone.

18. A checking, inspection and/or measuring installation including a conveyor conforming to claim 9, for transporting glass containers in a stable position suspended by their counter-ring, this installation including at least one receiver (40) and/or one emitter (41) of electromagnetic radiation for the checking, the inspection and/or the measuring of at least a portion of the containers transported by the conveyor and located below the counter-ring (7).

19. The installation according to claim 18, according to which at least one receiver (40) and/or at least one emitter (41) is positioned to observe the shoulder, the body or the bottom of the containers with the optical axis having a plunging angle ($\alpha$) to a horizontal plane (H) at the observed point on the optical axis greater than 45°.

* * * * *